United States Patent [19]
Emmerich et al.

[11] Patent Number: 5,715,734
[45] Date of Patent: Feb. 10, 1998

[54] LUBRICATING SYSTEM FOR BRAIDING MACHINE

[75] Inventors: Wolfgang Emmerich, Bad Münstereifel; Michael Schomburg, Delligsen; Axel Nagel, Alfeld, all of Germany

[73] Assignee: Spirka Maschinenbau GmbH, Alfeld, Germany

[21] Appl. No.: 681,058

[22] Filed: Jul. 22, 1996

[30] Foreign Application Priority Data

Jul. 21, 1995 [DE] Germany ............ 195 26 744.3

[51] Int. Cl.⁶ .................................... D04C 3/36
[52] U.S. Cl. ........................ 82/62; 87/33; 87/44
[58] Field of Search .................... 87/62, 33, 44; 184/26

[56] References Cited

U.S. PATENT DOCUMENTS

| | | | |
|---|---|---|---|
| 3,640,176 | 2/1972 | Gaul | 87/33 |
| 4,620,473 | 11/1986 | Bull | 87/33 |
| 4,729,278 | 3/1988 | Graeff et al. | 87/44 |

FOREIGN PATENT DOCUMENTS

| | | | |
|---|---|---|---|
| 1150844 | 6/1963 | Germany | 184/26 |
| 19 19 198 | 11/1970 | Germany . | |
| 89 01 157 | 6/1989 | Germany . | |
| 91 04 315 | 10/1991 | Germany . | |
| 93162 | 6/1962 | Netherlands | 184/26 |

*Primary Examiner*—William Stryjewski
*Attorney, Agent, or Firm*—Herbert Dubno; Andrew Wilford

[57] ABSTRACT

The instant invention is a lubricating system used in a braiding machine having a pair of relatively rotating parts sliding on each other at a location. The system has a stationary tube shaft extending vertically as a single piece along an axis and formed with a passage having an axially extending section and, extending therefrom, a radially outwardly open section. A pump supplies a lubricant fluid under pressure to the axially extending passage section and a distributor star fixed to one of the parts has a flow passage with a radially outer end at the location and a radially inner end. A bearing supports the star on the shaft for rotation about the axis with the inner passage end of the star opening into the outwardly open passage section of the shaft so that fluid from the pump flows along the shaft passage and then along the star passage to the location. Seals between the star and the shaft axially flank the inner passage end of the star.

8 Claims, 1 Drawing Sheet

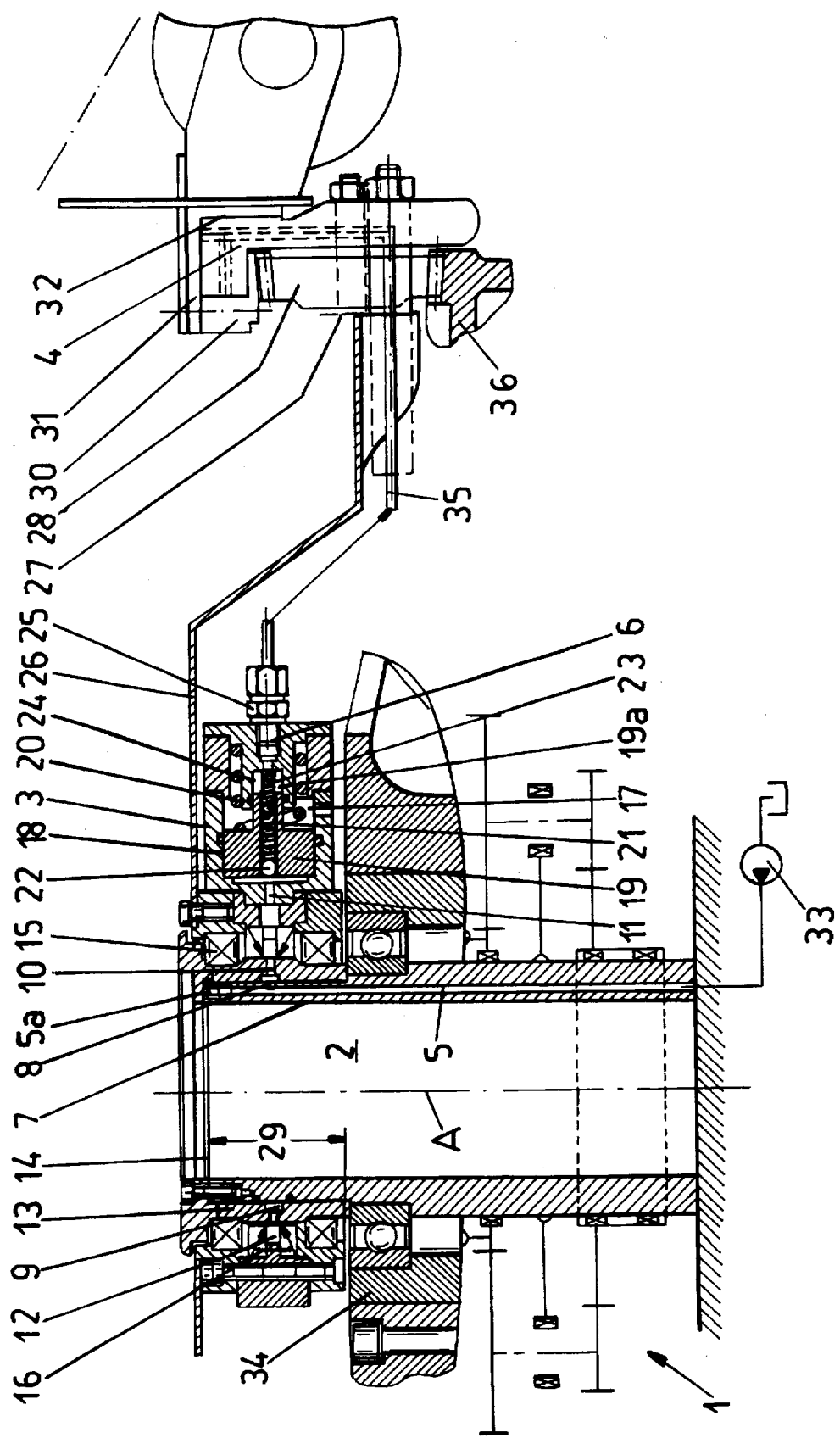

5,715,734

LUBRICATING SYSTEM FOR BRAIDING MACHINE

FIELD OF THE INVENTION

The present invention relates to a braiding machine. More particularly this invention concerns a lubricating system for such a machine.

BACKGROUND OF THE INVENTION

A braiding machine such as described in German utility models 8,901,157 and 9,104,315 as well as in U.S. Pat. No. 3,640,176 has a central shaft on which is supported a pair of wheels each in turn carrying a plurality of spools of filament or ribbon. A drive oppositely rotates the two wheels and a strand to be covered with braid is pushed up through the central shaft so that the counterrotating wheels wind their filaments on the strand in an overlapping and interlocked braid. Such a machine is used, for example, to make coaxial cable or reinforced hydraulic hoses.

The wheels of such systems normally ride on support rails and/or on each other since they are quite massive. The support surfaces of the structure must therefore be lubricated, as well as the rotating parts of the wheels. Thus a flow of lubricant must be provided normally through the central shaft and through a so-called distributor star to the various points on the wheels that need lubrication. In order to get the oil to where it is needed, it must be under considerable pressure, and since the flow path must move across relatively moving joints, leakage and sealing are real problems.

OBJECTS OF THE INVENTION

It is therefore an object of the present invention to provide an improved lubricating system for a braiding machine.

Another object is the provision of such an improved lubricating system for a braiding machine which overcomes the above-given disadvantages, that is which ensures a good flow of lubricant to the remote parts of the machine but that is of simple and leak-proof construction.

SUMMARY OF THE INVENTION

The instant invention is a lubricating system used in a braiding machine having a pair of relatively rotating parts sliding on each other at a location. The system has according to the invention a stationary tube shaft extending vertically as a single piece along an axis and formed with a passage having an axially extending section and, extending therefrom, a radially outwardly open section. A pump supplies a lubricant fluid under pressure to the axially extending passage section and a distributor star fixed to one of the parts has a flow passage with a radially outer end at the location and a radially inner end. A bearing supports the star on the shaft for rotation about the axis with the inner passage end of the star opening into the outwardly open passage section of the shaft so that fluid from the pump flows along the shaft passage and then along the star passage and through a hydraulic force amplifier to the location. Seals between the star and the shaft axially flank the inner passage end of the star and are provided for sealing the low pressure side upstream of the hydraulic force amplifier against the bearing of the star.

Thus with the present invention the possibility of leakage at a special mounting head atop the tube shaft is eliminated by making the tube shaft as one piece. Directly mounting the star on the stationary tube shaft also simplifies manufacture of the system. Since the pressure upstream of the hydraulic force amplifier is relatively low, leakage at the seals flanking the inner passage end, in the region of relative rotation, is unlikely. On the other hand the amplifier is capable of producing the high pressure needed for proper lubrication. Thus one has the advantage of minimal likelihood of leakage upstream in the regions where the lubricant must pass between relatively moving parts while still applying the lubricant at high pressure to the sensitive sliding surfaces of the relatively moving outer parts of the apparatus.

According to the invention the hydraulic force amplifier is provided in the passage of the star for forcing the fluid into the location with a pressure greater than the pressure in the tube passage. Thus it is possible to use a relatively low-pressure fluid supply but still force the lubricant fluid at a much higher pressure into the locations needing lubrication. The joints upstream of the pressure amplifier or multiplier are not subjected to the higher pressure so leakage is less likely even with a less elaborate seal system. The pump according to the invention supplies the fluid at a pressure or about 3 bar and the force amplifier increases this pressure to between about 10 bar and 15 bar. This amplifier operates in pulses dependent on a rotation rate of the star on the shaft.

The parts have a plurality of such locations needing lubrication according to this invention and the star has a plurality of passages for the locations and each star passage is provided with a respective such amplifier. Thus once again the pressure is fed through the relatively moving parts at low pressure and the pressure is boosted once inside the star where leakage is less a problem. The amplifier according to the invention is provided with a differential piston having a big face exposed to pressure of the fluid in the shaft passage.

The shaft of this invention is provided with a sleeve having a radially inwardly open groove into which the outer section of the shaft passage opens and formed with a radially outwardly open bore extending between the groove and the star passage. Such a sleeve is relatively easy to manufacture as compared to making these formations on the much larger tube shaft. The sleeve is fixed on the shaft and the bearing is carried on the sleeve. The shaft has two such bearings axially spaced from each other and flanking the outer passage section and axially spaced seal rings flanking the outer passage section between the bearings. The flanking bearings are lubricated by permanently trapped grease.

BRIEF DESCRIPTION OF THE DRAWING

The above and other objects, features, and advantages will become more readily apparent from the following description, reference being made to the accompanying drawing whose sole figure is a partly diagrammatic axially vertical section through a braiding machine according to the invention.

SPECIFIC DESCRIPTION

As seen in the drawing a braiding machine 1 according to this invention has a support 34 carrying a vertical, one-piece, and stationary tube shaft 2 centered on a vertical axis A and supporting in an upper bearing region 29 a distributor star 3. The tube shaft 2 has fixed on its upper end a bearing sleeve 13 held in place by a tube end ring or cap 14 and on which a pair of axially spaced roller bearings 15 carry this star 3 so that it can rotate about the axis A on the shaft 2.

A connecting carrier has arms 26 that have inner ends fixed to the star 3 and outer ends carrying a spool-support ring 4 riding on a surface 32 of another ring 31. A gear ring 30 carried on the track 31 meshes with a planet gear 28 carried on a schematically illustrated shaft 27 on the star 3 so as to rotate the ring 4 in one direction while the ring 31 rotates oppositely, with the other sides of the gears 28 in mesh with a stationary annular rack 36 of the support 34. An array of spools of braiding filament or ribbon is mounted on the ring 4 and another array is mounted on the slide 31 so that the two arrays counterrotate and produce the desired braid on a workpiece strand passing vertically up through the shaft 2. This structure is standard (see above-cited German 8,901,157).

The shaft 2 is formed with an axially throughgoing feed tube or passage section 5 closed at the upper end by a plug 5a and with a radial outwardly open bore or passage section 8. The sleeve 13 has a radially inwardly open circular channel or groove 9 into which the bore 8 opens and a radially throughgoing bore 10 opening into a space 12 between two oil seal rings 16. A pump 33 provides lubricant oil at a top pressure of about 3 bar to the passage network 7 formed by the formations 5, 8, 9, 10, and 12.

From the annular passage or compartment 12 the lubricating oil flows through another passage 11 to a hydraulic pressure amplifier 17 and thence via a passage 6 and fitting 25 to a line 35 extending to the region 32 where the ring 4 rides on the ring 31. The passage 11 opens into a front compartment 18 defined on the radial inner face of a piston 19 having a small-diameter extension 19a slidable in another compartment or bore 24 connected to the passage 6.

A spring 20 urges the piston 19 radially inward to a position of minimum volume of the compartment 18. This piston 19 is formed with a radially throughgoing central bore or passage 21 provided at its radially inner end with a check-valve ball or valve element 22 biased radially inward by a relatively weak spring 23. So long as the pressure in the front or inner compartment 18 exceeds the pressure in the back or outer compartment 24 by at least about 0.3 bar to 0.4 bar, the ball 22 will move off its seat and allow flow from the compartment 18 through the bore 21 to the compartment 24. The area of the radially inwardly directed face of the piston 19 exposed in the compartment 18 is about five times greater than the area of the radially outwardly directed face of the piston extension 19a exposed in the compartment 24. One such pressure amplifier 17 is provided for each location needing lubrication.

The pressure amplifier 17 functions as follows:

The low-pressure (3 bar) fluid from the pump 33 flows axially up the passage 5 and radially outward along the passage 8 to the annular passage 9 whence it flows radially out through the passage 10 to the compartment 12, thence via the passage 11 to the compartment 18. The force of the spring 20 is sufficient to counter this pressure, but, presuming that the compartment 24 is at zero pressure, the force of the spring 23 is not. Thus the ball 22 will be pushed back and there will be flow through the passage 21 from the compartment 18 to the compartment 24.

The inflow into the compartment 24 will normally be greater than the flow out through the passage 6 so that pressure will build up in the compartment 24. Once the pressure in the compartment 24 is almost equal (difference of 0.3 bar to 0.4 bar) to the pressure in the compartment 18, the check valve formed by the ball 22 and its seat in the piston 19 will close. Thus the 3 bar incoming pressure will be effective on the large front face of the piston 19 and a nearly identical pressure will be effective on its smaller rear face, so that the piston 19 will move outward, effecting a 5:1 pressure amplification. The fluid will be forced out the passage 6 and along the line 35 to the lubrication location 32 at a pressure of 10 bar to 15 bar.

Once the piston 19 bottoms, the pressure in the compartment 24 will continue to drop until it plus the force of the spring 20 is enough to shift the piston 19 radially inward, normally with some flow through the passage 21, returning the piston 19 to the starting position where the cycle will start again. At no point will the pressure in the entire system drop to zero so that the system will never need bleeding.

We claim:

1. In a braiding machine having a pair of relatively rotating parts sliding on each other at a location, a lubricating system comprising:

a stationary tube shaft extending vertically as a single piece along an axis and formed with a passage having an axially extending section and, extending therefrom, a radially outwardly open section;

pump means for supplying a lubricant fluid under pressure to the axially extending passage section;

a distributor star fixed to one of the parts and having a flow passage with a radially outer end at the location and a radially inner end;

upper and lower bearings flanking the inner passage end of the star and supporting the star on the shaft for rotation about the axis with the inner passage end of the star opening into the outwardly open passage section of the shaft, whereby fluid from the pump flows along the shaft passage and then along the star passage to the location; and upper and lower seals between the star and the shaft axially flanking the inner passage end of the star, each seal lying between the respective bearing and the inner passage end of the star.

2. The braiding-machine lubricating system defined in claim 1, further comprising means including a hydraulic force amplifier in the passage of the star for forcing the fluid into the location with a pressure greater than the pressure in the tube passage.

3. The braiding-machine lubricating system defined in claim 2 wherein the pump means supplies the fluid at a pressure of about 3 bar and the force amplifier increases this pressure to between about 10 bar and about 15 bar.

4. The braiding-machine lubricating system defined in claim 3 wherein the amplifier operates in pulses dependent on a rotation rate of the star on the shaft.

5. The braiding-machine lubricating system defined in claim 4 wherein the parts have a plurality of such locations, the star having a plurality of passages for the locations and each star passage being provided with a respective such amplifier.

6. The braiding-machine lubricating system defined in claim 4 wherein the amplifier is provided with a differential piston having a big face exposed to pressure of the fluid in the shaft passage.

7. The braiding-machine lubricating system defined in claim 1 wherein the shaft is provided with a sleeve having a radially inwardly open groove into which the outer section of the shaft passage opens and formed with a radially outwardly open bore extending between the groove and the star passage, the sleeve being fixed on the shaft and the bearing being carried on the sleeve.

8. In a braiding machine having a pair of relatively rotating parts sliding on each other at a location, a lubricating system comprising:

a stationary tube shaft extending vertically along an axis and formed with a passage having an axially extending section and, extending therefrom, a radially outwardly open section;

pump means for supplying a lubricant fluid under pressure to the axially extending passage section;

a distributor star fixed to one of the parts and having a flow passage with a radially outer end at the location and a radially inner end;

upper and lower bearings vertically flanking the inner passage end of the star and supporting the star on the shaft for rotation about the axis with the inner passage end of the star opening into the outwardly open passage section of the shaft, whereby fluid from the pump flows along the shaft passage and then along the star passage to the location;

upper and lower seals between the star and the shaft axially flanking the inner passage end of the star, each seal lying between the respective bearing and the inner passage end of the star; and means including a hydraulic force amplifier in the passage of the star for forcing the fluid into the location with a pressure greater than the pressure in the tube passage.

* * * * *